June 29, 1926.
C. A. BRYANT
LOADING AND CONVEYING MECHANISM
Filed June 17, 1925
1,590,883
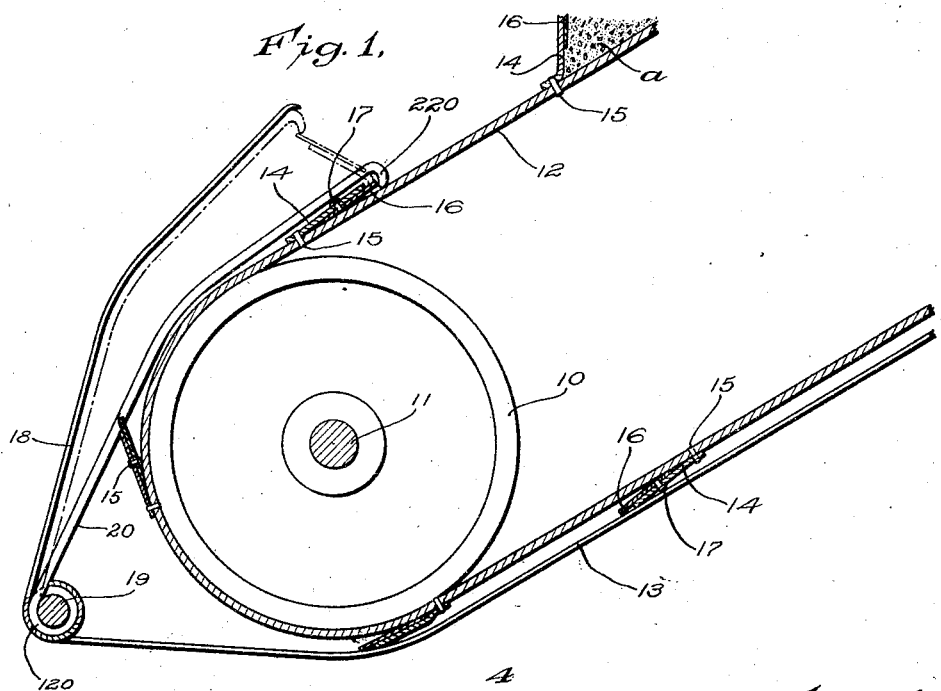
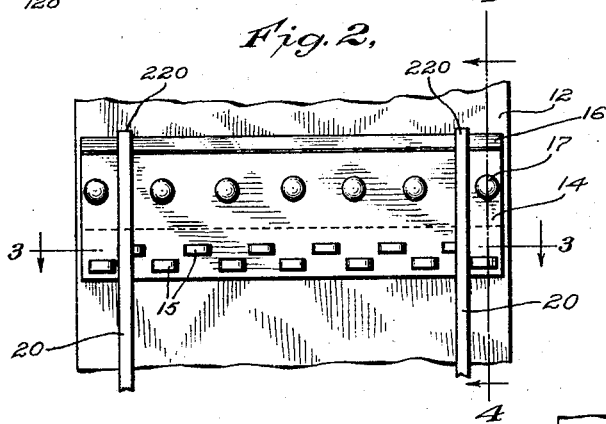
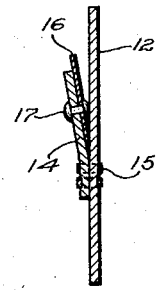
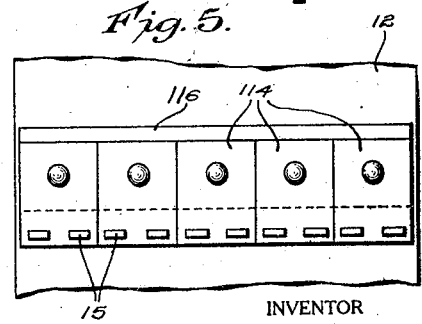
WITNESSES
INVENTOR
CYRUS A. BRYANT
BY
ATTORNEYS Patented June 29, 1926.

1,590,883

UNITED STATES PATENT OFFICE.

CYRUS A. BRYANT, OF PASSAIC, NEW JERSEY.

LOADING AND CONVEYING MECHANISM.

Application filed June 17, 1925. Serial No. 37,759.

My invention relates to loading and conveying means and more particularly to an endless elevating and conveying means employing cleats or flights.

The general object of my invention is to provide conveying means including a conveyer belt having novel flights and means to act upon the flights and lift the same at such an angle to the belt surface that the belt will receive the material to be conveyed and in a manner that the cleats will maintain the material to be conveyed in position for effective conveying without danger of the material rolling or slipping over the cleat or flight.

A further object of the invention is to provide novel automatic lifting means for the flights.

The manner and means whereby the above and other objects are attained will clearly appear as the description proceeds.

Reference is to be had to the accompanying drawings forming a part of this specification, it being understood that the drawings are merely illustrative of one example of the invention.

Figure 1 is a view in longitudinal vertical section of the feed end of an endless conveyer embodying my invention;

Figure 2 is a fragmentary plan view showing parts entering into my invention;

Figure 3 is a transverse vertical section on the line 3—3, Figure 2;

Figure 4 is a longitudinal vertical section on the line 4—4, Figure 2;

Figure 5 is a plan view of a fragment of the belt equipped with a modified form of cleat.

In the illustrated example of my invention, the numeral 10 indicates a pulley on the transverse shaft 11 at the feed end of an endless conveyer over which pulley an endless conveyer belt 12 runs. The numeral 13 indicates conventionally framework beneath the return run of the conveyer.

In accordance with my invention, I provide a novel cleat or flight designated generally by the numeral 14 in Figures 1 to 4, hereinafter referred to as a cleat. Said cleat may consist of a single transverse strip of rubber or equivalent flexible material to possess resiliency normally tending to maintain the cleat close to the load surface of of the belt 12. In Figure 5 is indicated a cleat 114 which is made up of a plurality of flexible sections laid side by side across the belt. The flexible resilient cleat 14 is secured to the belt by any approved fastener means advantageously by clinched U-shaped fastener clips 15. Each cleat 14 embodies a stiffener and wear plate 16 (or a plate 116, Figure 5). The plate 16 or 116 projects beyond the front forward edge of the resilient cleat 14 so as to protect said forward edge and advantageously in practice the plate is fastened to the flexible cleat 14 by rivets 17, the heads of which rivets at the under side of said cleat contact with the load surface of the belt 12 and maintain the cleat at a slight angle to said load surface. The construction, however, as will be obvious, permits the said cleat to be raised to be disposed at an increased angle to the belt surface. Usually, the arrangement is such that the cleat 14 when disposed behind a load increment $a$ will present an upward or forward inclination.

The numeral 18, Figure 1, indicates the usual flap hinged to a cross pin 19 to normally gravitate to a position lying above and at an angle to the belt 12 and disposed over the pulley 10 and pin 19. The flap 18 in practice, as is known, is provided to prevent an undue quantity of material falling backwardly over the pulley 10 and transverse pin 19 from the feed end of the belt 12.

In accordance with my invention, I provide means to automatically lift the cleats 14 at the load end of the conveyer to position said cleats at an angle for receiving load increments in front of the successive cleats as they pass over the pulley at the feed end of the belt.

For the stated purpose, use is made of hooks 20 having coils 120 about the cross pin 19 so that the hooks may swing on said pin. A pair of hooks 20, as in practice, is shown in Figure 2 and disposed respectively adjacent the side edges of the belt 12 above the same and extending forwardly of the pulley 10 sufficiently to engage a cleat 14 directly after the latter passes over pulley 10. For engaging the cleat 14 the forward ends or the bills 220 of the hooks normally tend to rest upon or lie adjacent to the load surface of the belt 12.

Reverting to the flap 18, it is explained that the ordinary flap lies close to the belt. In my invention said flap is disposed at a sufficient angle to allow clearance beneath the same for the lifting of the cleats 14 as the latter pass about the pulley.

With the described arrangement as the belt travels about the pulley 10 and the working run of the belt starts upwardly or forwardly away from pulley, each cleat in succession will engage the bills 220 of the hooks 20. Consequently, as the belt continues to travel and the cleat is held back by engagement of the hooks, the cleat will rise to an angle such as represented in dotted lines (Fig. 1) for receiving the load increment a. With the belt raised at the proper angle by the hooks 20, the load directed to the belt by any approved means (not shown) will fall in front of the raised cleat and be effectively retained on the belt against any tendency to fall backwardly over the cleat.

The strengthening and wear plate 16 (or 116) of a cleat receives the contact of the hooks 20 and protects the front edge of the flexible cleat material 14.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

It is to be understood that the form of the flights per se as shown and described is not claimed in the present application but form the subject-matter of a separate application pending concurrently herewith, filed June 19, 1925, Serial Number 38,249.

Having thus described my invention, I claim:—

1. In a loading and conveying means, an endless conveyer belt, flights thereon adapted to be raised, and hinged flight-lifting members disposed in the path of travel of the flights and positioned to engage the forward edges of the flights for raising the flights to a load-receiving position.

2. A loading and conveying means including a conveyer belt, flexible cleats thereon, and cleat-lifting means disposed in the path of travel of the cleats adapted to engage the same for lifting them to a load-receiving position.

3. In a loading and conveying means, a travelling conveyer belt, flexible flights thereon, rigid plates on the cleats and projecting beyond the forward edges thereof, and cleat-lifting means disposed in position to engage the said plates.

4. In a loader and conveyer, a travelling belt, resilient cleats thereon normally tending to assume a position close to the belt, and elements disposed in the path of travel of the cleats and adapted to engage the same in a manner to raise the cleats to a load-receiving position.

5. In a loader and conveyer, a travelling belt, cleats on the belt adapted to be raised to increase their angle to the belt surface, and hooks having downwardly disposed bills in position to engage the cleats and adapted to raise the same to a load-receiving position.

6. In a loader and conveyer, a travelling belt, cleats on the belt adapted to be raised to increase their angle to the belt surface, and hooks having downwardly disposed bills in position to engage the cleat and adapted to raise the same to a load-receiving position, said hooks being pivoted so that under the action of gravity they will tend to maintain the cleat-engaging position.

7. In a loader and conveyer, an endless travelling belt, a pulley at the feed end of the belt over which the belt runs, a flap overlying the pulley, cleats on the belt, and flexible to lie adjacent to the belt or to assume a position at an increased angle to the belt surface, and hinged elements beneath said flap, said elements having members tending to engage the cleats and effect a lifting action thereon.

8. In a loader and conveyer, a travelling belt, a pulley at the feed end of the belt and over which said belt runs, a flap above the pulley and pivoted at one end, cleats on the belt and flexible to lie adjacent to the belt or to assume a position at an increased angle to the belt surface, said flap being at such an angle to the belt as to present a space between said flap and the pulley, affording clearance for the cleats as the belt passes over said pulley, and hinged elements beneath said flap, said elements having members tending to engage the cleats and effect a lifting thereof.

CYRUS A. BRYANT.